United States Patent
Schwyzer

(10) Patent No.: US 12,141,281 B2
(45) Date of Patent: Nov. 12, 2024

(54) MACHINE LEARNING-BASED MALWARE DETECTION IN PROCESS MEMORY

(71) Applicant: CrowdStrike, Inc., Sunnyvale, CA (US)

(72) Inventor: Felix Schwyzer, Berlin (DE)

(73) Assignee: CrowdStrike, Inc., Sunnyvale, CA (US)

(*) Notice: Subject to any disclaimer, the term of this patent is extended or adjusted under 35 U.S.C. 154(b) by 302 days.

(21) Appl. No.: 17/862,623

(22) Filed: Jul. 12, 2022

(65) Prior Publication Data

US 2023/0394145 A1    Dec. 7, 2023

Related U.S. Application Data

(60) Provisional application No. 63/348,756, filed on Jun. 3, 2022.

(51) Int. Cl.
  G06F 21/56    (2013.01)
  G06F 21/53    (2013.01)
  G06N 20/00    (2019.01)

(52) U.S. Cl.
  CPC .......... *G06F 21/564* (2013.01); *G06F 21/53* (2013.01); *G06N 20/00* (2019.01)

(58) Field of Classification Search
  CPC ...... G06F 21/564; G06F 21/53; G06F 21/566; G06N 20/00; G06N 3/09
  See application file for complete search history.

(56) References Cited

U.S. PATENT DOCUMENTS

| | | | |
|---|---|---|---|
| 9,665,713 B2 * | 5/2017 | Avasarala | G06F 21/566 |
| 2020/0228559 A1 * | 7/2020 | McLane | G06F 21/55 |
| 2021/0256127 A1 * | 8/2021 | Miserendino | G06F 21/56 |
| 2023/0409715 A1 * | 12/2023 | Nissim | G06F 9/45533 |

* cited by examiner

*Primary Examiner* — Baotran N To
(74) *Attorney, Agent, or Firm* — Womble Bond Dickinson (US) LLP

(57) ABSTRACT

A plurality of memory image data is obtained. Respective ones of the memory image data may include captured memory contents from an executing process. Training data including feature vectors and classification values are provided to a machine learning (ML) training model executing on a processing device. The feature vectors may include indications of patterns within the memory image data. The ML training model is trained based on the training data to generate an ML production model. The training may include computing a plurality of model parameters that relate the feature vectors of the training data to the classification values of the training data.

20 Claims, 8 Drawing Sheets

MACHINE LEARNING-BASED MALWARE DETECTION IN PROCESS MEMORY

CROSS-REFERENCE TO RELATED APPLICATIONS

This application claims the benefit of U.S. Provisional Application Ser. No. 63/348,756, titled "MACHINE LEARNING-BASED MALWARE DETECTION IN PROCESS MEMORY," filed on Jun. 3, 2022, the disclosure of which is incorporated herein by reference in its entirety.

TECHNICAL FIELD

Aspects of the present disclosure relate to detecting malicious executables, and more particularly, to detecting malicious executables through analysis of process memory.

BACKGROUND

Malware is a term that refers to malicious software. Malware includes software that is designed with malicious intent to cause intentional harm and/or bypass security measures. Malware is used, for example, by cyber attackers to disrupt computer operations, to access and to steal sensitive information stored on the computer or provided to the computer by a user, or to perform other actions that are harmful to the computer and/or to the user of the computer. Malware may be formatted as executable files (e.g., COM or EXE files), dynamic link libraries (DLLs), scripts, steganographic encodings within media files such as images, and/or other types of computer programs, or combinations thereof. Malware authors or distributors frequently disguise or obfuscate malware in attempts to evade detection by malware-detection or -removal tools.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
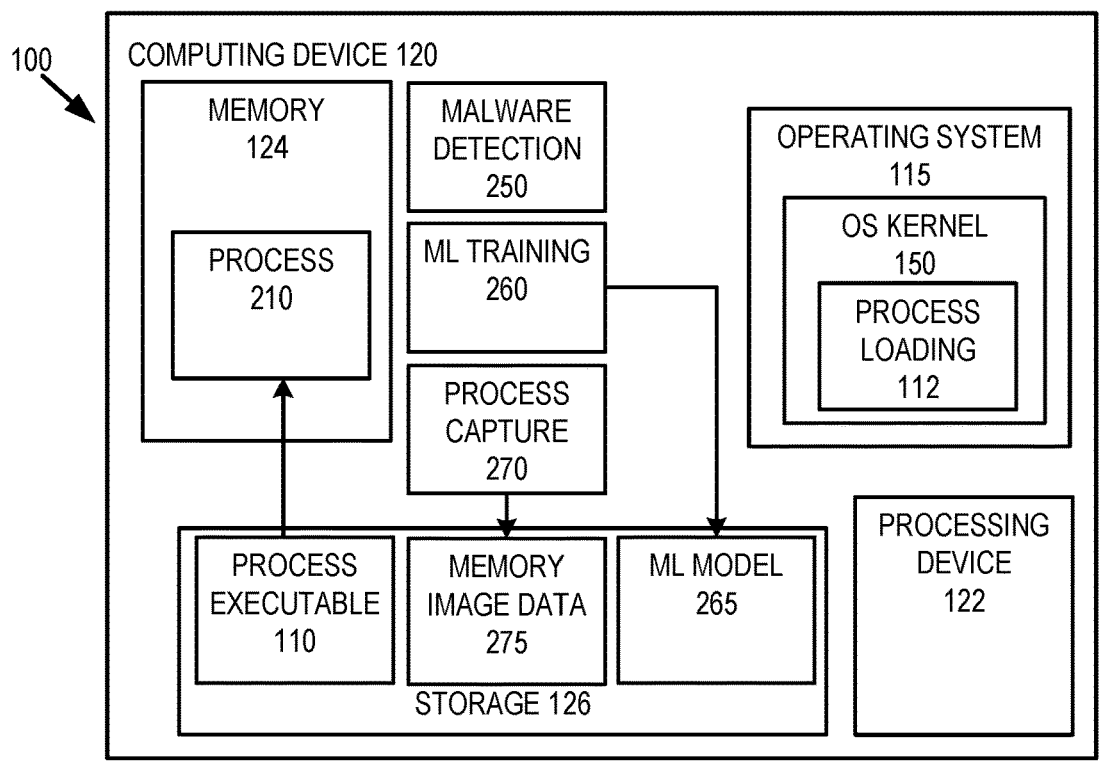
FIG. 1 is a block diagram that illustrates an example system, according to some embodiments of the present disclosure.

Modern computer systems are subject to a large number of potential malware attacks. Examples of malware include computer viruses, worms, Trojan horses, ransomware, rootkits, keyloggers, spyware, adware, rogue security software, potentially unwanted programs (PUPs), potentially unwanted applications (PUAs), and other malicious programs. To protect from such malware, users may install scanning programs which attempt to detect the presence of malware. These scanning programs may review programs and/or executables that exist on the computer's storage medium (e.g., a hard disk drive (HDD)) prior to execution of the file. However, authors and distributors of malware have taken countermeasures to avoid these scanning programs. In some cases, the malware is obfuscated to conceal the contents of the file. Obfuscation may include varying the contents of the file to misdirect, confuse, or otherwise conceal the true purpose and/or function of the code. For example, obfuscation may include inserting inoperable code within the executable instructions, compressing/encrypting the operating instructions, rearranging the code instructions, and/or other techniques. These techniques can make it difficult to identify malware in at-rest files.

The present disclosure addresses the above-noted and other deficiencies by providing a feature extractor and machine learning operation that can identify malware from running processes. In some cases, when an executable program containing malware is executed, obfuscation that was present in the stored executable may be removed and/or rearranged as a consequence of generating an executing process from the stored executable. By analyzing running processes, data can be retrieved from de-obfuscated images. This data can then be analyzed to detect the malware. In some embodiments, described herein, a memory dump and/or capture may be taken from running processes. The memory capture may be analyzed (e.g., by executable instructions implementing a feature extractor) to detect whether certain features are present. For example, a data file associated with the memory capture may be analyzed for particular byte n-grams, particular strings, characteristics of decoded instruction content, and/or entropy. The presence and/or absence of these particular features within the memory capture may be provided to a machine learning model to create a tool capable of classifying such memory captures. In this way, memory images can be scanned, and malware detected, despite the presence of obfuscation techniques applied to the executable file.

The embodiments described herein provide improvements over some scanning mechanisms which rely on the detection of particular signatures. In sharp contrast, the feature extractor described herein may be capable of determining features (e.g., characteristics of data within a memory capture) that are indicative of an executing process that contains malware. These features may be identified, in some cases, regardless of attempts by an author of the malware to change its data signature. In this way, embodiments according to the present disclosure may provide an improved capability of detecting malware, and may increase the security of a computer system.

FIG. 1 is a block diagram that illustrates an example system 100, according to some embodiments of the present disclosure. FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a computing device 120 (also referred to herein as a host computing device 120). The computing device 120 may include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

A storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The computing device 120 may comprise any suitable type of computing device or machine that has a programmable processor including, for example, server computers, desktop computers, laptop computers, tablet computers, smartphones, set-top boxes, etc. In some examples, the computing device 120 may comprise a single machine or may include multiple interconnected machines (e.g., multiple servers configured in a cluster). The computing device 120 may be implemented by a common entity/organization or may be implemented by different entities/organizations.

The computing device 120 may execute an operating system 115 (also referred to herein as a "host operating system"). The operating system 115 of computing device 120 may manage the execution of other components (e.g., software, applications, etc.) and/or may manage access to the hardware (e.g., processors, memory, storage devices etc.) of the computing device 120. Operating system 115 may be software to provide an interface between the computing hardware (e.g., processing device 122 and/or storage device 126) and applications running on the operating system 115. Operating system 115 may include an OS kernel 150 and a user space supporting the execution of one or more processes 210. Though only a single process 210 is illustrated in FIG. 1, it will be understood that a plurality of processes 210 may be present. Operating system kernel 150 may include several operating system functionalities, including but not limited to process management, hardware interfaces, access control and the like. The OS kernel 150 may execute with an elevated privilege and may manage the administration of the operating system 115. Examples of operating systems 115 include WINDOWS™, LINUX™, ANDROID™, IOS™, and MACOS™.

As illustrated in FIG. 1, computing device 120 may execute (e.g., using processing device 122) a process 210. Process 210 may be a desktop application, a network application, a database application, or any other application that may be executed by the operating system 115. To be executed, the process 210 may be loaded from a process executable 110 (e.g., in storage device 126) into memory 124. The process executable 110 may be a file, for example, on the storage device 126 that contains executable instructions. In some embodiments, the loading of the process 210 may be performed by a process loading component 112 of the OS kernel 150. Once in memory, the operating system 115 may allocate execution resources (e.g., processing device 122) to the process 210 (e.g., by a multi-tasking scheduler). The processing device 122 may execute the executable instructions of the process 210.

The image of the process 210 in memory (e.g., a data structure and/or physical layout) may differ from a data structure and/or physical layout of the process executable 110. As part of the process loading (e.g., as performed by the process loading component 112), the process executable 110 may be analyzed and portions of the process executable 110 may be loaded into memory 124. For example, the executable instructions of the process executable 110 may be extracted and transferred to memory 124. The process loading component 112 may also establish portions of the memory 124 for use by the process 210. These portions may include data used by and/or generated by the process 210 during execution.

Figures 2A, 2B:
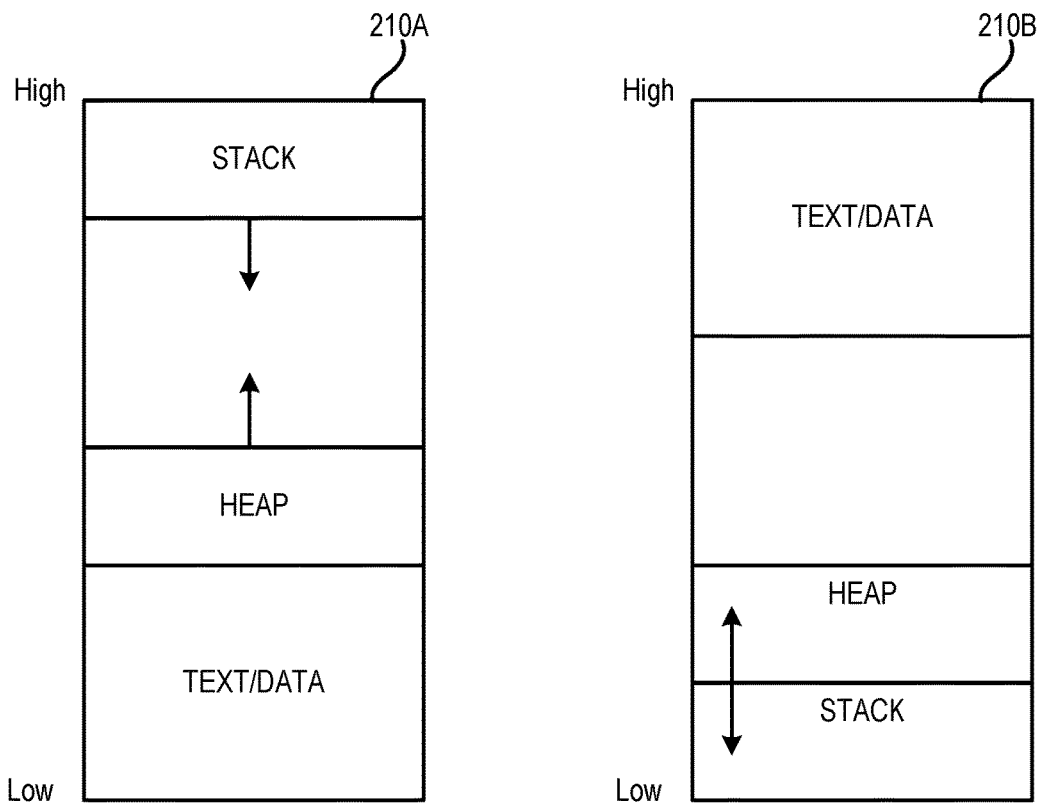
FIGS. 2A and 2B are block diagrams illustrating examples of how a process may be organized in memory, according to some embodiments of the present disclosure.

FIGS. 2A and 2B are block diagrams illustrating examples of how a process 210 may be organized in memory 124, according to some embodiments of the present disclosure. FIGS. 2A and 2B are examples only, and are not intended to limit the embodiments of the present disclosure. FIG. 2A is a block diagram that illustrates an example process 210A according to some LINUX- and/or UNIX-based operating systems, executing within a computing device, in accordance with some embodiments of the present disclosure. FIG. 2B is a block diagram that illustrates an example process 210B according to some WINDOWS-based operating systems, executing within a computing device, in accordance with some embodiments of the present disclosure. FIGS. 2A and 2B are schematic examples only, and are not intended to limit the embodiments of the present disclosure.

Referring to FIG. 2A, in a LINUX- and/or UNIX-based infrastructure, a computing device 120 may load the process 210 into memory 124 according to a first configuration. For example, at lower (e.g., numerically) addresses of the address space of the process 210A, the process 210A may include the text and/or data portions of the process 210A. The addresses in FIGS. 2A and 2B represent virtual addresses of the address space of the process 210, and physical addressing may be different.

The text portion of the process 210A may include computer instructions for execution. In some embodiments, the text portion of the process 210A may be read only. The computer instructions of the text portion may, in some embodiments, be loaded from the process executable 110. The data portion of the process 210A may include initialized global and static variables which have a pre-defined value and can be modified. In some embodiments, the data portion of the process 210A may also be loaded from the process executable 110. For example, initialized data values may be stored/saved into the process executable 110 for availability during execution of the process 210A. The text and data portions of the process 210A are illustrated as combined in FIG. 2A for simplicity but, in some embodiments, they may be separated within the address space.

The stack portion of the process 210A may be arranged to provide for storing data during execution of the process 210A. In some embodiments, the stack portion of the process 210 may be a last-in first-out (LIFO) structure that can be utilized to save and/or store data during transitions between operations of the process 210. For example, the stack may be used to store registers and/or local variables of a first function when that function calls a second function. The registers and/or local variables may be restored when the second function returns to the first function. In the example of FIG. 2A, the stack portion of the process 210A may be placed at higher (e.g., numerically) addresses of the address space of the process 210A. As the stack grows in the example of FIG. 2A, it grows towards lower addresses. In some embodiments, portions of the stack may not be provided within the process executable 110, but may instead be dynamically generated during execution of the process 210A.

The heap portion of the process 210A may be arranged to provide for dynamic memory allocation during execution of the process 210A. In the example of FIG. 2A, the heap portion of the process 210A is provided between the text/data portion(s) and the stack portion. For example, memory allocations that are performed during execution of the process 210A may be provided from the heap. As the heap grows in the example of FIG. 2A, it grows towards higher addresses. In some embodiments, portions of the heap may not be provided within the process executable 110, but may instead be dynamically generated during execution of the process 210A.

FIG. 2B illustrates some of the differences in the process space between LINUX-based process implementations and WINDOWS-based process implementations. As illustrated in FIG. 2B, the WINDOWS-based implementation may contain many of the same structures as in a LINUX-based implementation, but organized differently. For example, FIG. 2B illustrates an example process 210B, according to some embodiments of the present disclosure. Referring to FIG. 2B, the process 210B may also include a text/data portion. The text/data portion may be placed at higher addresses within the address space of the process 210B. As previously noted, at least some portions of the text/data portion of the process 210B may be loaded from the process executable 110.

Similarly, the process 210B may also include a stack portion and a heap portion. The stack portion may be placed at lower addresses within the address space of the process 210B and may grow to lower addresses. The heap portion may be between the stack portion and the text/data portion within the address space of the process 210B, and may grow to higher addresses. As previously noted, at least some portions of the stack and heap portions of the process 210B may not be present in the process executable 110.

As illustrated in FIGS. 2A and 2B, various implementations of a process 210 may differ between embodiments of operating systems 115. Moreover, the layout and/or content of the process 210 for a given process executable 110 may differ from the process executable 110 itself. Embodiments of the present disclosure may leverage an understanding of these differences to provide improved malware detection.

Referring back to FIG. 1, a malware detection engine 250 may execute on the computing device 120. The malware detection engine 250 may be configured to detect a presence of malicious software (referred to herein as "malware") on the computing device 120 (or associated with the computing device 120). Malware includes software and/or executing instructions that are designed to disrupt, damage, or gain unauthorized access to a computing device 120. Malware may be formatted as executable files (e.g., COM or EXE files), dynamic link libraries (DLLs), scripts, steganographic encodings within media files such as images, and/or other types of computer programs, or combinations thereof.

In some embodiments, the malware detection engine 250 may be configured to scan a process executable 110 to detect malware. The scan may involve an analysis of the contents of the process executable 110 to detect traces of malware. For example, the malware detection engine 250 may analyze the contents of the process executable 110 to identify known signatures of code or particular types of viruses that are known to the malware detection engine 250. A process executable 110 that is identified to contain malware may be isolated within the computing device 120 and, for example, be prevented from executing.

However, developers of malware are aware of some of the techniques used by malware scanning programs, such as the malware detection engine 250. In response, developers of malware have obfuscated the contents of their process executables 110. For example, obfuscation may include inserting inoperable code within the executable instructions, compressing/encrypting the operating instructions, rearranging the code instructions, and/or other techniques. Obfuscated code may be more difficult to process with the malware detection engine 250 because a signature of the malware may be removed or otherwise obscured by the obfuscation.

The obfuscation of the process executable 110 may be less of a barrier when the process executable 110 is loaded into a process 210, however. As previously discussed, the layout of a process 210 that is formed from a process executable 110 is different from the contents of the process executable 110. For example, code that may be compressed within the process executable 110 (e.g., to avoid detection) may be expanded during the operation of the process 210 corresponding to the process executable 110. In order to execute the malicious instructions of the malware and/or access operating data of the malicious instructions, a process executable 110 containing malware may make the malicious instructions visible within memory 124 during execution of the associated process 210. This may make the malicious instructions and/or data visible while in memory 124. As a result, a process 210 associated with a process executable 110 containing malware may be vulnerable to scanning by malware detection engine 250, while the process 210 is executing in memory 124.

To take advantage of this vulnerability, some embodiments of the present disclosure may be configured to generate a machine learning (ML) model 265 based on memory image data 275 taken from executing processes 210 by a process capture engine 270. The memory image data 275 may be used by an ML training engine 260 to generate the ML model 265. The ML model 265 may then be used by the malware detection engine 250 to detect malware from memory image data 275 associated with the process 210 instead of and/or in addition to scanning for signatures in the process executable 110. Embodiments of the present disclosure will be discussed in further detail with respect to the figures described herein.

In FIG. 1, though malware detection engine 250, ML training engine 260, and process capture engine 270 are illustrated as separate components, this is only for the sake of simplicity of illustration. In some embodiments, one or more of the malware detection engine 250, ML training engine 260, and process capture engine 270 may be combined with other components. Similarly, though malware detection engine 250, ML training engine 260, and process capture engine 270 are illustrated as separate from other components of the computing device 120 (e.g., from memory 124), this is only for ease of discussion. In some embodiments, one or more of the malware detection engine 250, the ML training engine 260, and/or the process capture engine 270 may be resident in memory 124 (e.g., as executable code instructions).

Though the computing device 120 is illustrated as a single component in FIG. 1, embodiments of the present disclosure are not limited thereto. In some embodiments, one or more of the malware detection engine 250, the ML training engine 260, and the process capture engine 270 may exist and/or execute on different computing devices 120. For example, a first computing device 120 may be used to capture running processes (e.g., utilizing process capture engine 270) to generate memory image data 275, a second computing device 120 may be used to perform ML training (e.g., utilizing ML training engine 260) to generate the ML model 265, and a third computing device 120 may be used to detect malware (e.g., utilizing malware detection engine 250) based on the ML model 265.

In order to generate the ML model 265, memory image data 275 may be gathered. The memory image data 275 may contain one or more snapshots of one or more running processes 210. The memory image data 275 may include an image (e.g., the data contents) of the process 210 in memory 124. The image of the process 210 may be a set of digital data representing the contents of the memory 124 that are associated with the process 210. In some embodiments, the memory image data 275 may include data regarding the addresses, which may be virtual addresses assigned by the operating system 115, of the process 210. The memory image data 275 may include what is commonly referred to as a memory dump of the process 210. For example, the memory image data 275 may include the contents of the memory space (e.g., within memory 124) of the process 210, including dynamically generated data (such as the heap portion and/or the stack portion illustrated in FIGS. 2A and 2B) that may not be present in process executable 110.

The memory image data 275 may be captured and/or obtained by process capture engine 270. The process capture engine 270 may be configured to generate the memory image data 275 by dynamically copying the contents of memory 124 of the computing device 120 (or other computing device, as will be described further herein). In some embodiments, the process capture engine 270 may be configured to capture the memory image data 275 associated with a single process 210. In some embodiments, the process capture engine 270 may be configured to capture the memory image data 275 associated with a plurality of processes 210.

Figure 3A:
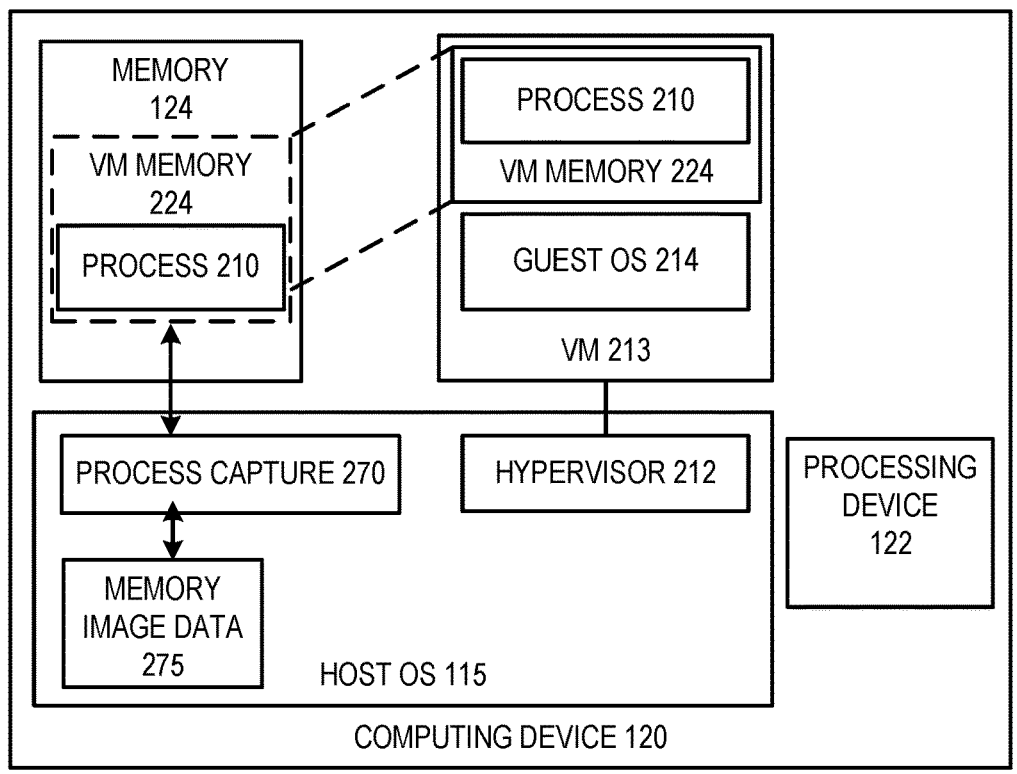
FIGS. 3A, 3B, and 3C are block diagrams illustrating examples of capturing memory image data, according to some embodiments of the present disclosure.
Figure 3B:
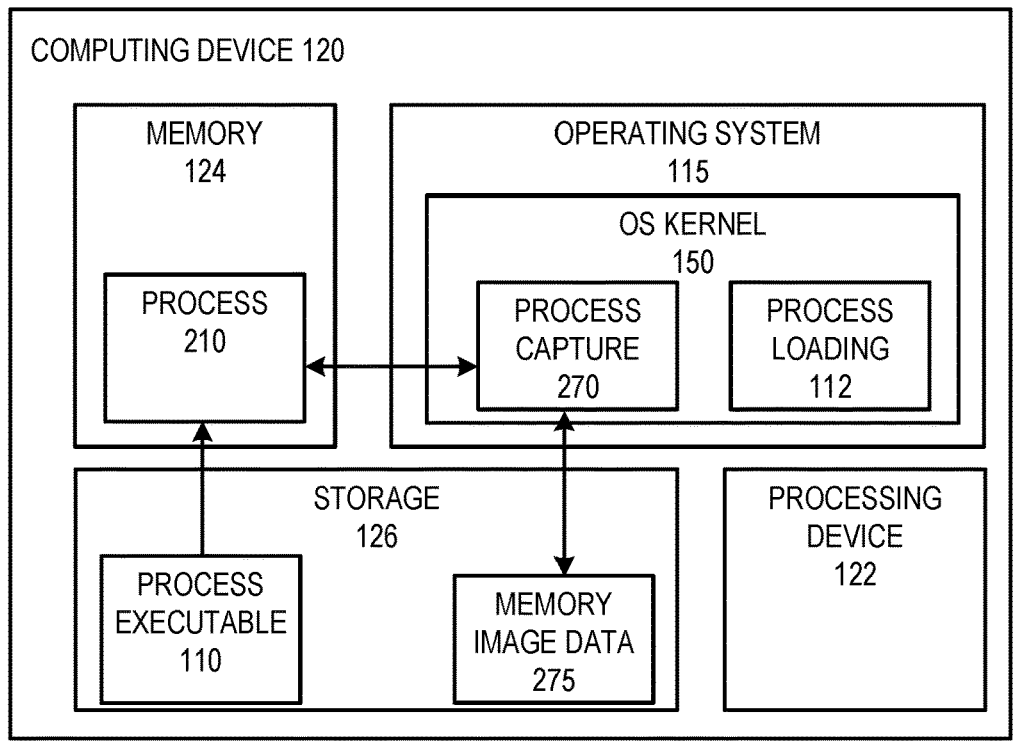
Figure 3C:
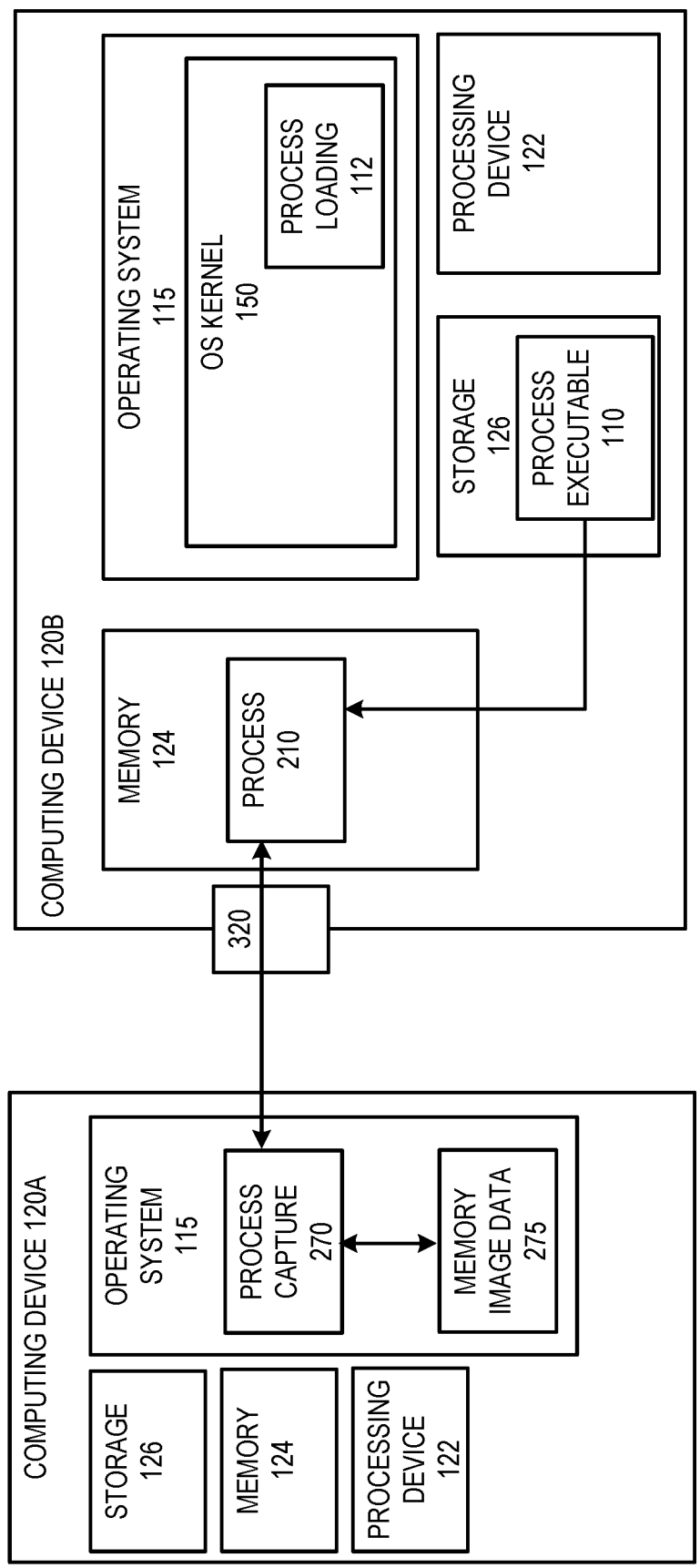

FIGS. 3A, 3B, and 3C are block diagrams illustrating examples of capturing memory image data 275, according to some embodiments of the present disclosure. A description of elements of FIGS. 3A to 3C that have been previously described will be omitted for brevity.

Referring to FIG. 3A, in some embodiments, process capture engine 270 may be configured to run on a host computing device 120 that is executing a virtual machine (VM) 213. The process 210 from which memory image data 275 is to be taken may be running on the VM 213, within VM memory 224 of the VM 213.

Computing device 120 may include a hypervisor 212, which may also be known as a virtual machine monitor (VMM). In the example shown, hypervisor 212 may be a component of a host operating system 115. In another example, hypervisor 212 may run on top of a host operating system 115, or may run directly on host hardware without the use of a host operating system 115. Hypervisor 212 may manage system resources, including access to physical processing devices 122 (e.g., processors, CPUs, etc.), physical memory 124 (e.g., RAM), storage device (e.g., HDDs, SSDs), and/or other devices (e.g., sound cards, video cards, etc.). The hypervisor 212, though typically implemented in software, may emulate and export a bare machine interface to higher level software in the form of virtual processors and guest memory. Higher level software may comprise a standard or real-time operating system (OS), may be a highly stripped down operating environment with limited operating system functionality, may not include traditional OS facilities, etc. Hypervisor 212 may present other software (i.e., "guest" software) the abstraction of one or more VMs 213 that provide the same or different abstractions to various guest software (e.g., guest operating system, guest applications).

VM 213 may execute guest software that uses an underlying emulation of the physical resources (e.g., virtual processors and guest memory 224). For example, a portion of the physical memory 124 of the host computing device 120 may be provided to the VM 213 for use as the VM memory 224 of the VM 213. As illustrated in FIG. 3A, VM 213 may execute the process 210 within a runtime environment such that the process 210 is included as part of the VM memory 224. Thus, since the VM memory 224 is part of the larger memory 124 of the host computing device 120, the process 210 is visible in memory 124 of the host computing device 120.

In some embodiments, process capture engine 270 may execute within the host operating system 115 of the host computing device 120, though the embodiments of the present disclosure are not limited thereto. In some embodiments, the process capture engine 270 may execute as part of the hypervisor 212.

The process capture engine 270 may be configured to perform a data copy of the process 210 executing within the memory 124 to generate memory image data 275. In some embodiments, the data copy may be made without the permission, or even the visibility, of the VM 213 and/or the process 210, since the host computing device 120 may control access to the memory 124.

The VM implementation of FIG. 3A may be advantageous, as the VM 213 may serve as a sandbox in which a potentially malicious piece of software may be executed without endangering other associated infrastructure. For example, in some embodiments, the hypervisor 212 can control access interfaces (e.g., networks) of the VM 213 to prevent or reduce any capability of a malicious process 210 from accessing resources outside the VM 213.

Referring to FIG. 3B, in some embodiments, the process capture engine 270 may be configured to run on a host computing device 120 that is executing the process 210. In some embodiments, process capture engine 270 may execute within the host operating system 115 of the host computing device 120. In some embodiments, the process capture engine 270 may execute as part of the operating system kernel 150. As part of the operating system kernel 150, the process capture engine 270 may have additional (e.g., administrative level) permissions including access to the full range of memory 124.

The process capture engine 270 may be configured to perform a data copy of the process 210 executing within the memory 124 to generate memory image data 275. In some embodiments, the data copy may be made without the permission, or even the visibility, of the process 210, since the operating system kernel 150 may control access to the memory 124.

For example, at some point after the process loading component 112 has loaded the process executable 110 into memory 124 as process 210, the process capture engine 270 may access memory 124 to generate the memory image data 275. In some embodiments, the process capture engine 270 may wait for some time duration after the formation of the process 210 by the process loading component 112 before performing the memory image capture. This may allow for operations within the process 210 to develop to a point where they can be observed as part of the memory image data 275.

Referring to FIG. 3C, in some embodiments, the process capture engine 270 may be configured to run on a first computing device 120A that is external to a second computing device 120B that is executing the process 210. In some embodiments, process capture engine 270 may execute within the host operating system 115 of the first computing device 120A. In some embodiments, the process capture engine 270 may execute as part of the operating system kernel 150 of the first computing device 120A, but the embodiments of the present disclosure are not limited thereto. In some embodiments, the process capture engine 270 may run as a non-privileged process (e.g., as a standard process) that is scheduled by the operating system 115 of the first computing device 120A.

The process capture engine 270 running on the first computing device 120A may be configured to access a process 210 executing on the second computing device 120B through an access interface 320. In some embodiments, the access interface 320 may be a wired or wireless connection between the first and second computing device 120A, 120B. The access interface 320 may be a public network (e.g., the internet), a private network (e.g., a local area network (LAN) or wide area network (WAN)), or a combination thereof. The access interface 320 may carry communications (e.g., data, message, packets, frames, etc.) between the first computing device 120A and the second computing device 120B. In some embodiments, the access interface 320 may be a debugging interface, such as a Joint Test Action Group (JTAG) interface.

The process capture engine 270 executing on the first computing device 120A may be configured to perform a data copy of the process 210 executing within the memory 124 of the second computing device 120B to generate memory image data 275. In some embodiments, the data copy may be made without the permission, or even the visibility, of the process 210. Though the process capture engine 270 is illustrated as being directly connected to the process 210 in FIG. 3C, the embodiments of the present disclosure are not limited to this configuration. In some embodiments, the process capture engine 270 may access the process 210 through one or more devices and or structures on the second computing device 120B. For example, the process capture engine 270 may communicate with the OS kernel 150 of the second computing device 120B via the access interface 320 to access the process 210 within the memory 124 of the second computing device 120B. As another example, the process capture engine 270 may communicate with a service processor or other device (not shown) of the second computing device 120B via the access interface 320 to access the process 210 within the memory 124 of the second computing device 120B.

In some embodiments, at some point after the process loading component 112 has loaded the process executable 110 into memory 124 as process 210, the process capture engine 270 may access memory 124 to generate the memory image data 275. In some embodiments, the process capture engine 270 may wait for some time duration after the formation of the process 210 by the process loading component 112 before performing the memory image capture. This may allow for operations within the process 210 to develop to a point where they can be observed as part of the memory image data 275.

The embodiments illustrated in FIGS. 3A to 3C are examples, and are not intended to limit the embodiments of the present disclosure. It will be understood that other memory capture techniques, as understood by those of ordinary skill in the art, may be used to generate a memory dump and/or capture of the process 210 executing within memory 124. In some embodiments, one or more of the examples of FIGS. 3A to 3C may be combined. For example, memory image data 275 may be generated by a process capture engine 270 executing within an OS kernel 150, as illustrated in FIG. 3B, where the OS kernel 150 is part of a guest OS 214 of a VM 213, as illustrated in FIG. 3A.

Referring back to FIG. 1, once the memory image data 275 is captured (e.g., using one or more of the techniques discussed herein with respect to FIGS. 3A to 3C), the memory image data 275 may be used to generate an ML model 265. For example, ML training engine 260 may analyze the memory image data 275 to train the ML model 265, such as by using machine learning techniques. In some embodiments, characteristics of the memory image data 275 may be extracted to use as input by the ML training engine 260. For example, the ML training engine 260 may form feature vectors from the memory image data 275, which may be used as part of one or more machine learning techniques.

Figure 4:
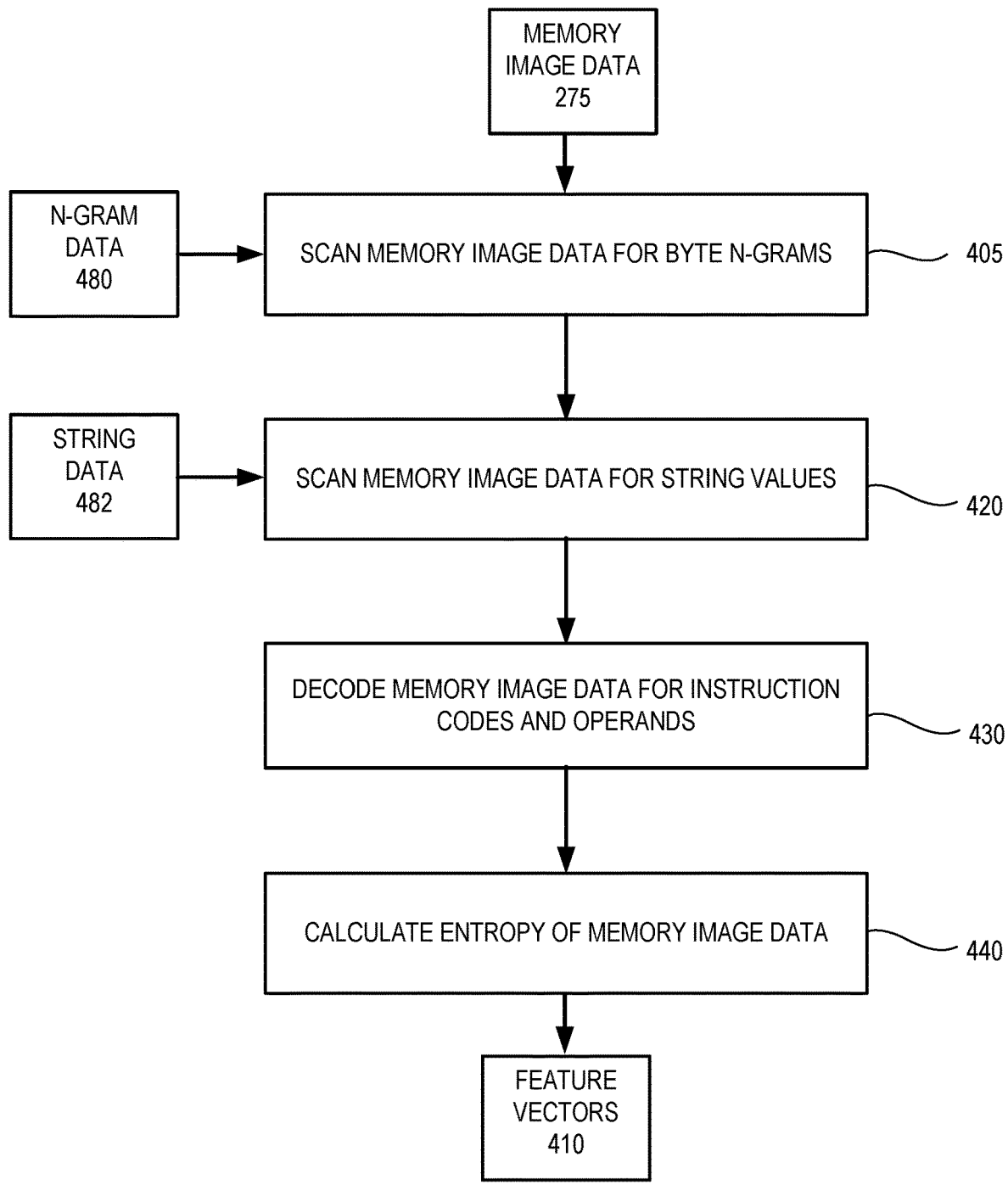
FIG. 4 is a flow diagram of a method for generating one or more feature vectors, according to some embodiments of the present disclosure.

FIG. 4 is a flow diagram of a method 400 for generating one or more feature vectors 410, according to some embodiments of the present disclosure. A description of elements of FIG. 4 that have been previously described will be omitted for brevity. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIG. 1 as well, the method 400 begins at block 405, in which memory image data 275, provided as input to the method 400, is scanned for byte n-grams. A byte n-gram is a contiguous sequence of n bytes (where n is an integer) within the memory image data 275. In some embodiments, a plurality of different byte n-grams that have been determined to be indicative of the types of operations and/or data associated with malware may be stored as byte n-gram data 480. The byte n-grams included in the byte n-gram data 480 may be indicative, for example, of a presence of malicious code within the process 210, such as shellcode.

As part of the operations of block 405, the memory image data 275 may be scanned (e.g., byte by byte) for each of the byte n-grams within the byte n-gram data 480. In some embodiments, a count of a number of a number of times a respective byte n-gram occurs in the memory image data 275 may be determined, for each byte n-gram in the byte n-gram data 480. These counts may be included as one or more of the feature vectors 410.

At block 420, the memory image data 275 is scanned for string values that may be indicative of malicious operations within the process 210. The string values may be a series of one or more data values, in some cases text characters, stored contiguously in memory. In some embodiments, a plurality of different strings that have been determined to be indicative of the types of operations and/or data associated with malware may be stored as string data 482. The strings included in the string data 482 may be indicative, for example, of a presence of malicious code within the process 210. For example, the string data 482 may include strings that are indicative of certain types of programmatic functions or other known data signatures.

As part of the operations of block 420, the memory image data 275 may be scanned (e.g., byte by byte) for each of the strings within the string data 482. In some embodiments, a count of a number of a number of times a respective string occurs in the memory image data 275 may be determined, for each string in the string data 482. These counts may be included as one or more of the feature vectors 410.

At block 430, the memory image data 275 is decoded to determine characteristics of instruction codes that may be present within the memory image data 275. The instruction codes may be data values representing an operational code (e.g., opcode) that may be interpreted by a processing device 122 as an instruction to perform a particular function of the processing device 122. The instruction code included in the memory image data 275 may be indicative, for example, of a presence of malicious code within the process 210. For example, executable portions of the memory image data 275 may include instruction codes for particular operations that are indicative of the types of operations performed by malicious software.

As part of the operations of block 430, the memory image data 275 may be decoded (i.e., instruction decoding), which may include examining the raw data of the memory image data 275 and converting this data to computer instructions. The resulting instruction codes (e.g., opcodes) may be added to the feature vectors 410. In some embodiments, the instruction lengths and operand counts for each instruction code as well as opcode counts over the whole memory image data 275 (e.g., a number of times a particular instruction code occurs in the memory image data 275) may be added to the feature vector 410 as characteristics of the instruction code within the memory image data 275.

At block 440, an entropy calculation may be performed on one or more portions of the memory image data 275. The entropy level may measure randomness of subsequent bytes relative to preceding bytes in the memory image data 275. For example, a text document often exhibits a low level of entropy, while an encrypted or compressed version of the same text document may exhibit an increased level of entropy.

One measure of entropy is known as Shannon Entropy, and is generally defined as:

$$H = -\sum_{1}^{n} P(i) \log_2 P(i)$$

where H is the entropy level (measured in bits), n is the number of bytes in the sample and P(i) is the probability of byte i appearing in the stream of bytes. The entropy value H is a measure of predictability of a given byte within the memory image data 275. The use of an entropy level in embodiments of the present disclosure include not only Shannon Entropy, but also other methods of calculating randomness of the memory image data 275 understood by those of ordinary skill in the art.

In some embodiments, an entropy level may be calculated for particular sub-quantities of the memory image data 275. For example, in some embodiments, an entropy may be calculated for each page (e.g., 4 KiB) of memory. In some embodiments, the calculated entropy for each of the sub-quantities (e.g., each page) of memory may be included as part of the feature vectors 410. In some embodiments, a calculated entropy within particular ranges may indicate a non-randomness indicative of instruction codes or other data consistent with malicious executable code.

An output of the method 400 may include the feature vector(s) 410 representing a result of the various operations performed as part of the analysis of the memory image data 275. The feature vectors 410 may be used to train the ML model 265 discussed herein with respect to FIG. 1.

As described, memory image data 275 may be provided as input to the method 400. The memory image data 275 may include a capture of all of the memory for a given process 210, but the embodiments of the present disclosure are not limited to such a configuration. In some embodiments, the operations of method 400 may be performed on selective portions of the memory image data 275. For example, the memory image data 275 may include the memory for a particular process 210 separated into discrete quantities, such as pages (e.g., 4 KiB). In some embodiments, as part of the capture of the memory image data 275, characteristics of the various pages of the captured memory image data 275 may be known. In some embodiments, the various pages of the memory image data 275 may be marked to identify particular access levels. For example, a first page of the memory image data 275 may be marked as being available for execution (e.g., be capable of being accessed by the processing device 122 to access instruction codes) and be read-only, while a second page of the memory image data 275 may be marked as being available for execution (e.g., be capable of being accessed by the processing device 122 to access instruction codes) and be read-write (e.g., supporting writes/modifications by the process 210). In some embodiments, the scanning operations described in FIG. 4 may be limited to scanning those pages that are read-write/execute (e.g., marked as being available for both read-write access and execution) when generating the feature vectors 410.

Figure 5A:
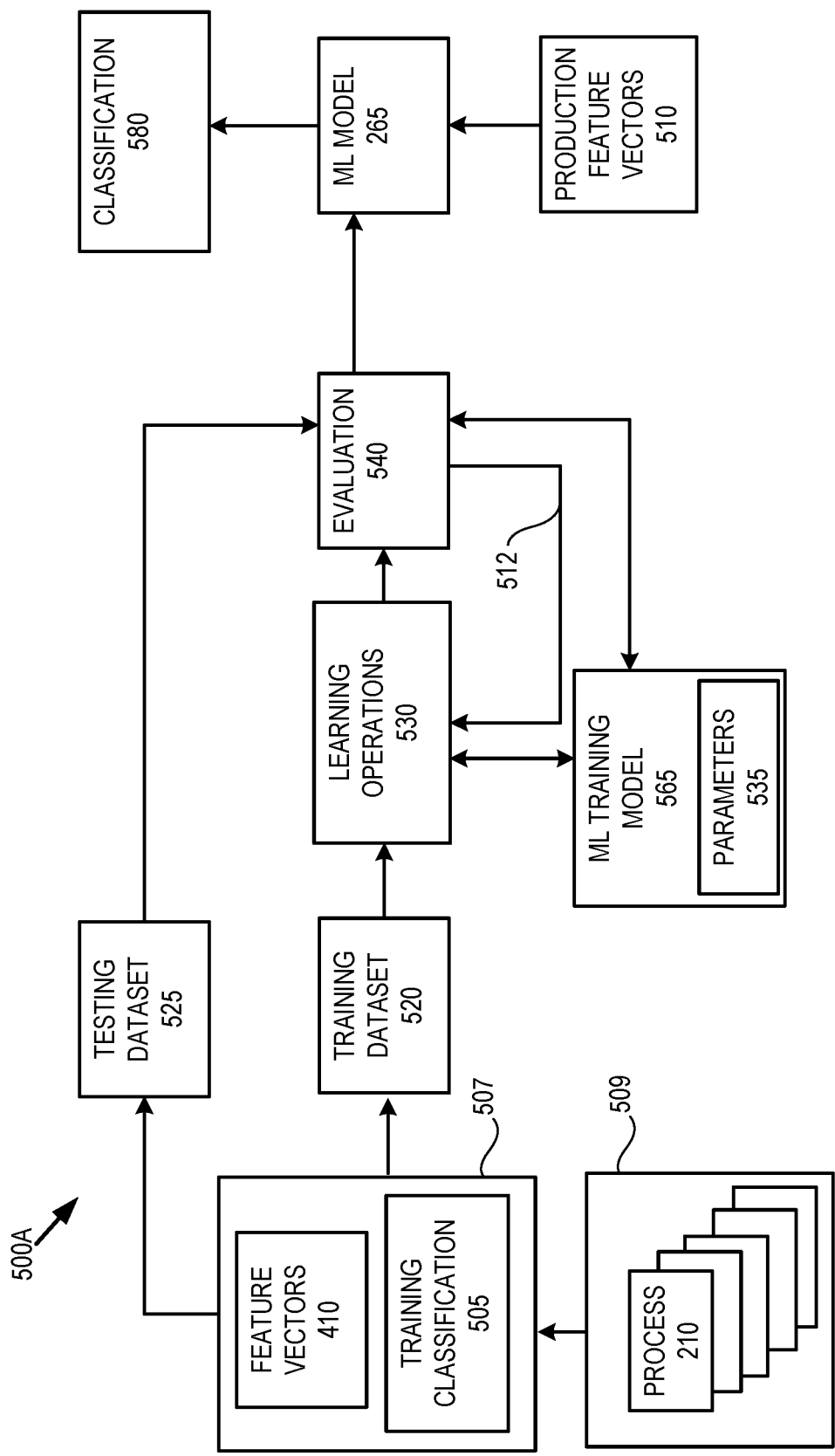
FIGS. 5A and 5B are block diagrams illustrating training systems for performing a machine learning operation based on feature vectors from memory image data, according to some embodiments of the present disclosure.
Figure 5B:
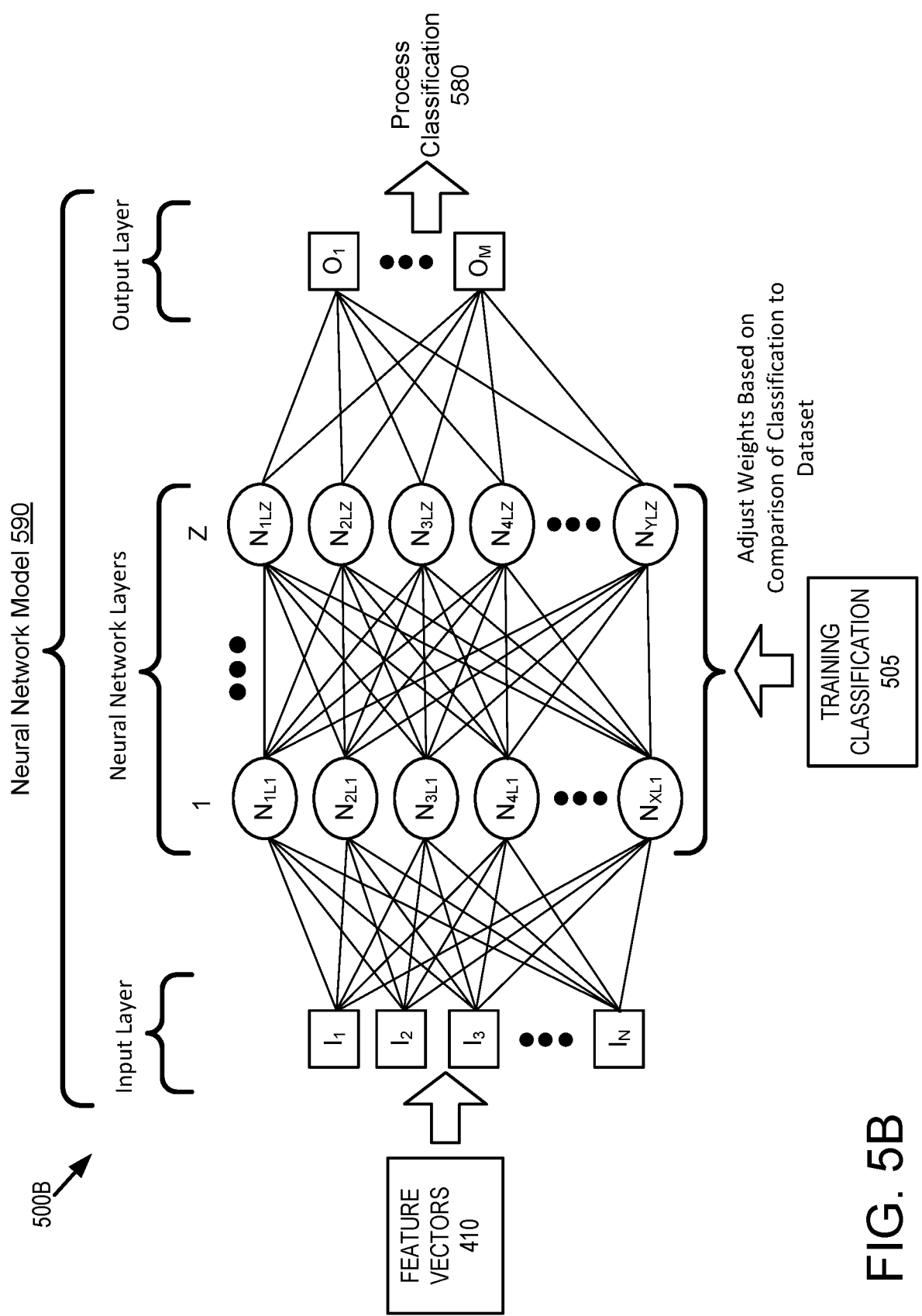

FIGS. 5A and 5B are block diagrams illustrating training systems 500 for performing a machine learning operation based on feature vectors 410 from memory image data 275, according to some embodiments of the present disclosure.

Referring to FIG. 5A, a system 500A for performing a machine learning operation may include learning operations 530 which perform a feedback controlled comparison between a training dataset 520 and a testing dataset 525 based on the feature vectors 410.

For example, the feature vectors 410, generated from the memory image data 275 as described herein, may be combined with training classification data 505 to generate process-specific input data 507. More specifically feature vectors 410 from a particular process 210 may be combined with training classification data 505 for the same process 210, where the training classification data 505 for the process 210 identifies whether the process 210 contains or is associated with malware. In some embodiments, as part of training an ML model 265, particular processes 210 from a group of processes 509 with known classifications (e.g., it is known whether the process 210 contains or is associated with malware) may be collected and feature vectors 410 may be formed from memory image data 275 associated with each of the processes 210 from the group of processes 509 with known classifications. The known classification of a given process 210 may be used as the training classification value 505 and combined with the feature vectors 410 to form the process-specific input data 507 for that process 210.

For example, memory image data 275 may be collected from a process 210 that is generated from a process executable 110 that is known to contain or be associated with malware. Thus, a training classification value 505 of the known-bad process 210 may be generated indicating that the process 210 is associated with malware. A set of feature vectors 410 may be generated from the memory image data 275 of this known-bad process 210. The set of feature vectors 410 may be combined with the training classification value 505 (e.g., malware) to generate the process-specific input data 507 for that process 210.

Similarly, memory image data 275 may be collected from a process 210 that is generated from a process executable 110 that is known to be free of malware. Thus, a training classification value 505 of the known-good process 210 may be generated indicating that the process 210 is free of malware. A set of feature vectors 410 may be generated from the memory image data 275 of this known-good process 210. The set of feature vectors 410 may be combined with a training classification value 505 (e.g., malware-free) to generate the process-specific input data 507 for that process 210.

In this way, process-specific input data 507 may be generated for each process 210 of a set of processes 509 used for training the ML model 265. The process specific input data 507 may be separated into two groups: a training dataset 520 and a testing dataset 525. Each group of the training dataset 520 and the testing dataset 525 may include process-specific input data 507 (e.g., feature vectors 410 and their associated training classification value 505) for a plurality of processes 210.

Learning operation 530 may be performed on the training dataset 520. The learning operations 530 may examine the feature vectors 410 to establish a relationship between the elements of the feature vectors 410 that accurately predict the classification value 505 (e.g., malware or not malware) for a given process 210. The learning operations 530 may generate a ML training model 565 that represents the determined relationship. The ML training model 565 may take a feature vector 410 as input, and output a classification value 505 (e.g., malware or non-malware) for the process 210 associated with the feature vector 410. The learning operations 530 may attempt to adjust parameters 535 of the ML training model 565 to generate a best-fit algorithm that describes a relationship between the feature vectors 410 and the classification value 505 for all of the processes 210 of the training dataset 520. A set of parameters 535 may be selected based on the training dataset 520 and preliminarily established as the ML training model 565.

The results of the learning operations 530 may be provided to an evaluation operation 540. The evaluation operation 540 may utilize the ML training model 565 generated by the learning operations 530 (based on the training dataset 520) to see if the ML training model 565 correctly predicts the training classification value 505 for the feature vectors 410 for the processes 210 of the testing dataset 525. If the ML training model 565 accurately predicts the classification values 505 of the testing dataset 525, it may be promoted to the ML model 265. If the ML training model 565 does not accurately predict the classification value 505 of the testing dataset 525, feedback 512 may be provided to the learning operations 530, and the learning operations 530 may be repeated, with additional adjustment of the parameters 535. This process of learning operations 530 and evaluation operation 540 may be repeated until an acceptable ML model 265 is generated.

Once the ML model 265 is generated, it may be used to predict classifications 580 for production feature vectors 510. For example, for a given process 210, a set of memory image data 275 may be generated. The memory image data 275 may be generated, for example, using one or more of the methods described herein with respect to FIGS. 3A to 3C. A set of feature vectors 410 may be generated in a manner similar to that discussed herein with respect to FIG. 4. For example, the memory image data 275 may be analyzed to determine one or more of a presence of a defined byte n-gram within the memory image data 275, a presence of a defined string value within the memory image data 275, characteristics of the instruction codes within the memory image data 275, or a calculated entropy of a portion of the memory image data 275.

As illustrated in FIG. 5A, the feature vector 410 may be provided as production feature vector 510 to the ML model 265. The operations of the ML model 265 may generate the classification 580 (e.g., whether or not the process 210 associated with the production feature vector 510 contains and/or is associated with malware).

The training system 500A may use a number of different types of machine learning algorithms. For example, in some embodiments, the training system 500A may use a cross-validation-based machine learning platform. In some embodiments, the training system 500A utilizes a k-folds cross-validation, though the embodiments of the present disclosure are not limited thereto. It will be understood that other types of cross-validation, as well as other types of machine learning, may be used without deviating from the embodiments of the present disclosure.

For example, FIG. 5B is a block diagram of a system 500B incorporating a neural network model 590 for generating a classification 580 of a process based on a set of feature vectors 410, according to some embodiments of the present disclosure.

Referring to FIG. 5B, the neural network model 590 includes an input layer having a plurality of input nodes $I_1$ to $I_N$, a sequence of neural network layers (layers 1 to Z are illustrated in FIG. 5B) each including a plurality (e.g., 1 to X in FIG. 5B) of weight nodes, and an output layer including at least one output node. In the particular non-limiting example of FIG. 5B, the input layer includes input nodes $I_1$ to $I_N$ (where N is any plural integer). A first one of the sequence of neural network layers includes weight nodes $N_{1L1}$ (where "1L1" refers to a first weight node on layer one) to $N_{XL1}$ (where X is any plural integer). A last one ("Z") of the sequence of neural network layers includes weight nodes $N_{1LZ}$ (where Z is any plural integer) to $N_{YLZ}$ (where Y is any plural integer). The output layer includes a plurality of output nodes O1 to $O_M$ (where M is any plural integer).

The neural network model 590 can be operated to process elements of the feature vectors 410 through different inputs (e.g., input nodes $I_1$ to $I_N$) to generate one or more outputs (e.g., output nodes O1 to $O_M$). The elements of the feature vectors 410 that can be simultaneously processed through different input nodes $I_1$ to $I_N$ may include, for example, one or more of counts of a presence of a defined byte n-gram within the memory image data 275, counts of a presence of a defined string value within the memory image data 275, counts of and/or data associated with characteristics of instruction codes within the memory image data 275, or a calculated entropy of a portion of the memory image data 275, as discussed herein with respect to FIG. 4. The process classification 580 that can be output (e.g., through output nodes O1 to $O_M$) may include an indication of whether the process 210 associated with the feature vector 410 is and/or is associated with malware.

During operation and/or training of the neural network model 590, the various weights of the neural network layers may be adjusted based on a comparison of predicted process classification 580 to data of an actual classification (such as training classification value 505). The comparison may be performed, for example, through the use of a loss function. The loss function may provide a mechanism to calculate how poorly the training model is performing by comparing what the model is predicting with the actual value it is supposed to output. The interconnected structure between the input nodes, the weight nodes of the neural network layers, and the output nodes may cause a given element of the feature vector 410 to influence the classification prediction generated for all of the other elements of the feature vector 410 that are simultaneously processed. The classification prediction 580 generated by the neural network model 590 may thereby identify a comparative prioritization of which of the elements of the feature vector 410 provide a higher/lower impact on the classification 580 as to whether the associated process 210 is, or is not, associated with malware.

The neural network model 590 of FIG. 5B is an example that has been provided for ease of illustration and explanation of one embodiment. Other embodiments may include any non-zero number of input layers having any non-zero number of input nodes, any non-zero number of neural network layers having a plural number of weight nodes, and any non-zero number of output layers having any non-zero number of output nodes. The number of input nodes can be selected based on the number of input values that are to be simultaneously processed, and the number of output nodes can be similarly selected based on the number of output characteristics that are to be simultaneously generated therefrom.

The systems 500A, 500B of FIGS. 5A and 5B provide an improvement in the technology associated with computer security. For example, the systems 500A, 500B provide an improved malware detection platform that is able to adapt to changes in malware that may be detected from a running instantiation of the malware (e.g., process 210). The systems 500A, 500B are an improvement over some techniques for malware detection in that they do not exclusively utilize static signatures, which may be quickly varied by malware developers. Instead, embodiments according to the present disclosure may identify malware based on characteristics of the running process associated with the malware, and may be able to bypass obfuscation techniques that might otherwise make the malware detection difficult.

Embodiments of the present disclosure have shown success with respect to known malware and compared favorably against some static machine learning-based malware detection models which extract features from stored (e.g., on disk) process executable images (referred to herein as "storage-based malware detection engines") rather than from processes in memory. For example, Table 1 illustrates the performance of an example of a prototype of a malware detection platform using an ML model based on feature vectors from memory image scans, according to some embodiments of the present disclosure.

TABLE 1

| Malware | High | Medium | Low | Bottom |
|---|---|---|---|---|
| Malware 1 | 0.8 | 0.8 | 0.9 | 1.0 |
| Malware 2 | 0 | 0.5 | 0.5 | 1.0 |

Table 1 shows the confidence bands (High, Medium, Low, Bottom) determined by the prototype as a detection result for two types of malware (Malware 1 and Malware 2) using an ML model based on feature vectors formed from memory captures of executing processes associated with known malware. As illustrated in Table 1, the prototype was able to successfully identify the malware with a high degree of confidence.

Comparisons were also performed with respect to the confidence bands for malware detection between a prototype formed according to embodiments of the present disclosure and two other storage-based malware detection engines. Tables 2-4 show a comparison of processes identified by the prototype as being associated with malware within a particular confidence band (High, Medium, Low), as compared to the confidence band determined by the two storage-based malware detection engines (Storage Detection 1 and Storage Detection 2) for the same process/executable.

TABLE 2

High Confidence

| Engine | High % | Medium % | Low % | Bottom % | Undetected |
|---|---|---|---|---|---|
| Prototype | 100% | 0% | 0% | 0% | 0% |
| Storage Detection 1 | 59.6% | 16.2% | 6.9% | 7.8% | 9.5% |
| Storage Detection 2 | 45.1% | 16.7% | 11.6% | 10.9% | 15.8% |

TABLE 3

Medium Confidence

| Engine | High % | Medium % | Low % | Bottom % | Undetected |
|---|---|---|---|---|---|
| Prototype | 0% | 100% | 0% | 0% | 0% |
| Storage Detection 1 | 54.0% | 22.2% | 6.6% | 3.0% | 14.1% |
| Storage Detection 2 | 47.5% | 19.2% | 10.6% | 9.6% | 13.1% |

TABLE 4

Low Confidence

| Engine | High % | Medium % | Low % | Bottom % | Undetected |
|---|---|---|---|---|---|
| Prototype | 0% | 0% | 100% | 0% | 0% |
| Storage Detection 1 | 40.0% | 16.3% | 14.8% | 10.4% | 18.5% |
| Storage Detection 2 | 31.9% | 20.0% | 7.4% | 19.3% | 21.5% |

As illustrated in Tables 2-4, the prototype formed according to some embodiments of the present disclosure reliably detects malware that may be missed by storage-based malware detection engines.

Figure 6:
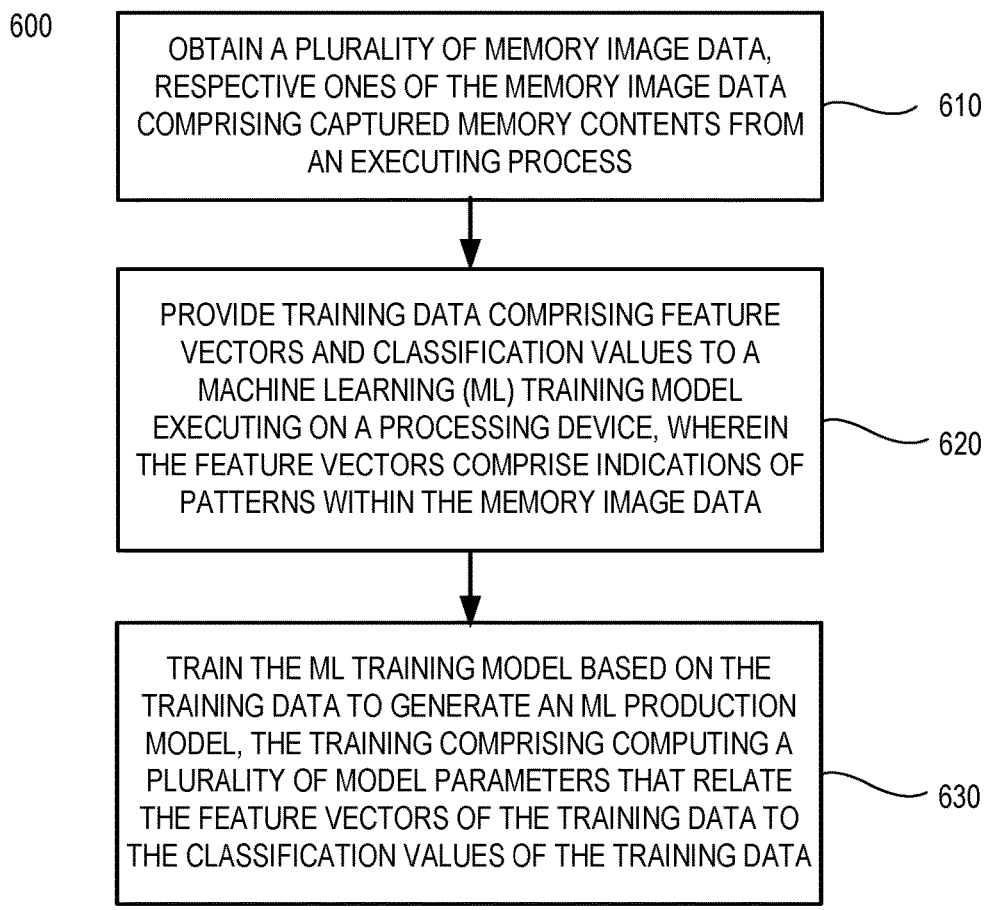
FIG. 6 is a flow diagram of a method for operating a malware detection system, according to some embodiments of the present disclosure.

FIG. 6 is a flow diagram of a method 600 for operating a malware detection system, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., computing device 120).

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Referring simultaneously to the prior figures as well, the method 600 begins at block 610, in which a plurality of memory image data 275 is obtained. Respective ones of the memory image data 275 may include captured memory contents from an executing process 210. In some embodiments, at least one of the plurality of memory image data 275 is captured from the respective executing process 210 that is running on a virtual machine 213.

At block 620, training data 507 including feature vectors 410 and classification values 505 are provided to an ML training model 565, 590 executing on a processing device 122. The feature vectors 410 may include indications of patterns within the memory image data 275. In some embodiments, the feature vectors 410 comprise one or more of: a presence of a defined byte n-gram within the memory image data 275, a presence of a defined string value within the memory image data 275, characteristics of instruction codes within the memory image data 275, or a calculated entropy of a portion of the memory image data 275.

At block 630, ML training model 565, 590 is trained based on the training data 507 to generate an ML production model 265. The training may include computing a plurality of model parameters 535 that relate the feature vectors 410 of the training data 507 to the classification values 505 of the training data. In some embodiments, the training further includes determining whether the classification values 505 of the training data match an output of the ML training model 565, 590. In some embodiments, training the ML training model 565, 590 comprises validating the training data 507 with respect to the classification values 505 using cross-validation, such as k-folds cross-validation.

In some embodiments, the method 600 further includes, in response to determining that the classification values 505 of the training data 507 do not match the output of the ML training model 565, 590, adjusting one or more of the plurality of model parameters 535 and repeating the training of the ML training model 565, 590 based on the training data 507.

In some embodiments, the method 600 further includes providing a captured memory image to the ML production model to generate a malware classification for a process associated with the captured memory image.

Figure 7:
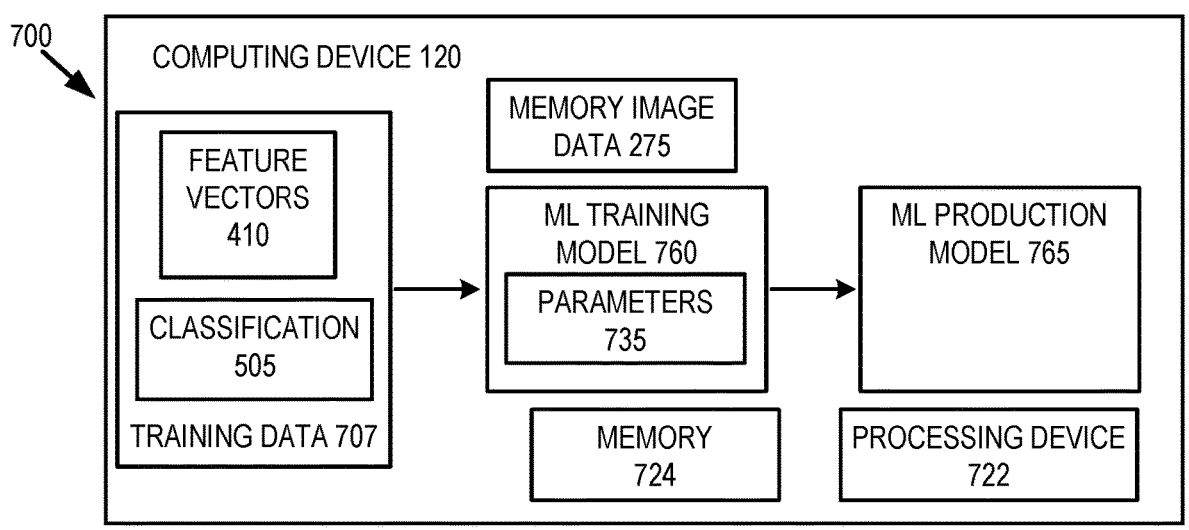
FIG. 7 is a component diagram of an example of a malware training and/or detection architecture, in accordance with embodiments of the disclosure.

FIG. 7 is a component diagram of an example of a malware training and/or detection architecture 700, in accordance with embodiments of the disclosure. The device architecture 700 includes computing device 120 having processing device 122 and memory 124, as described herein with respect to FIGS. 1 to 6.

The computing device 120 may obtain memory image data 275. The memory image data 275 may include memory contents captured from an executing process, such as executing process 210 described herein with respect to FIGS. 1 and 3A to 3C.

Training data 707 that includes feature vectors 410 and classification values 505 may be provided to a training ML model 760 executing on a processing device 122. The ML training model 760 may be similar to the ML training model 565 used by learning operations 530 discussed herein with respect to FIG. 5A and/or the neural network model 590 discussed herein with respect to FIG. 5B. The feature vectors 410 may include patterns within the memory image data 275, as discussed herein with respect to FIG. 4.

The computing device 120 (e.g., through operation of processing device 122) may train the ML training model 760 to generate an ML production model 765. The ML production model 765 may be similar to the ML model 265 described herein with respect to FIGS. 1 to 6. The training of the ML training model may include computing a plurality of model parameters 735 that relate the feature vectors 410 to the classification values 505 of the training data 707. The model parameters 735 may be similar to the parameters 535 described herein with respect to FIG. 5A and/or the weights of the layers described herein with respect to FIG. 5B.

The device architecture 700 of FIG. 7 provides an improved capability for malware detection. The device architecture 700 allows for detection of malware based on characteristics of a process executing in memory instead of, or in addition to, malware detection based on signatures of executable files.

Figure 8:
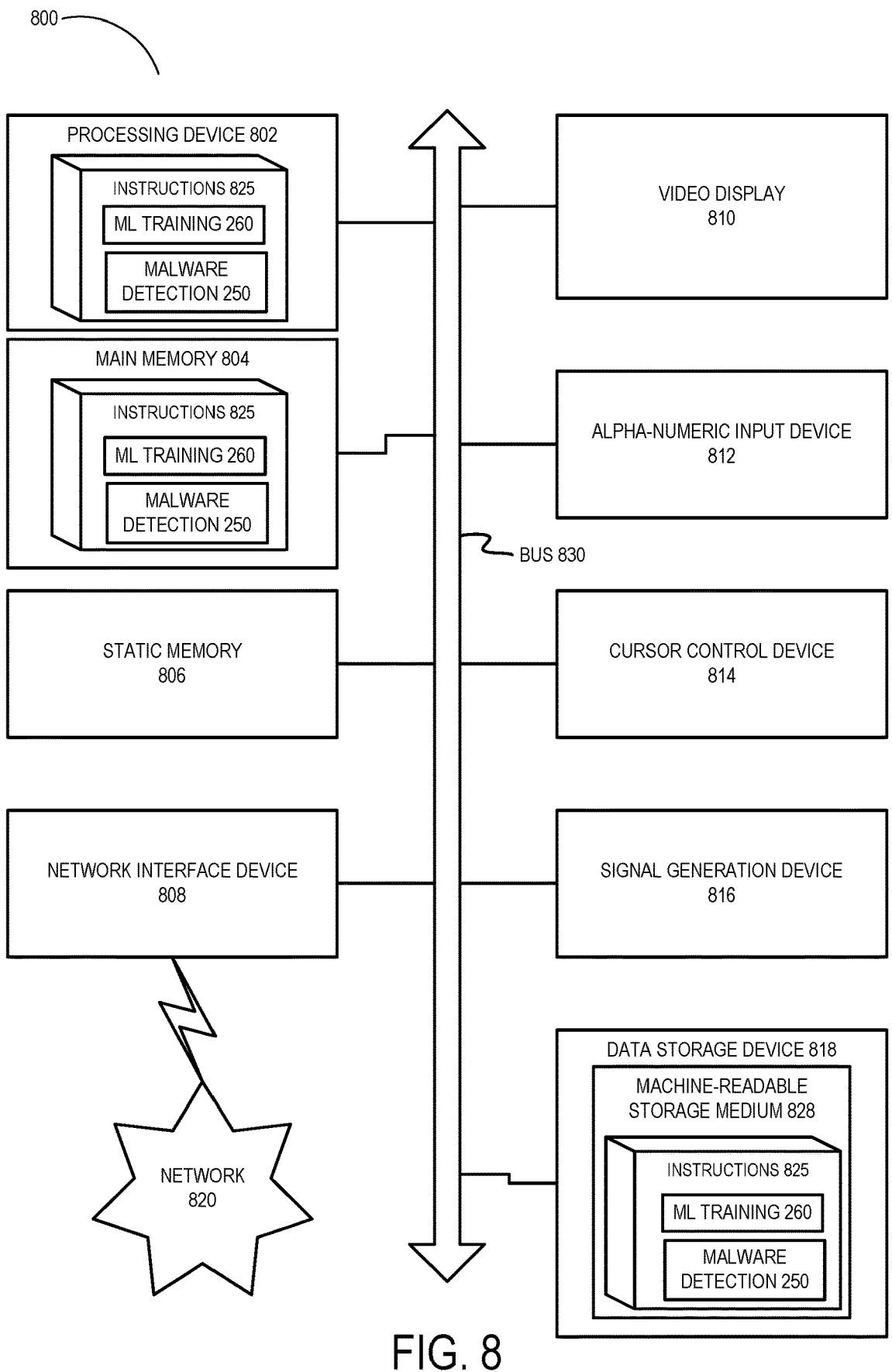
FIG. 8 is a block diagram of an example computing device that may perform one or more of the operations described herein, in accordance with embodiments of the disclosure.

FIG. 8 is a block diagram of an example computing device 800 that may perform one or more of the operations described herein, in accordance with some embodiments of the disclosure. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also include one or more special-purpose processing devices such as an application specific integrated circuit (ASIC), a field programmable gate array (FPGA), a digital signal processor (DSP), network processor, or the like. The processing device 802 may execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for a malware detection engine 250 and/or an ML training engine 260 for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "obtaining," "providing," "training," "determining," "validating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A computer implemented method for detecting malware, the method comprising:
   obtaining a plurality of memory image data, respective ones of the memory image data comprising captured memory contents from an executing process;
   providing training data comprising feature vectors and classification values to a machine learning (ML) training model executing on a processing device, wherein the feature vectors comprise indications of patterns within the memory image data; and
   training, by the processing device, the ML training model based on the training data to generate an ML production model, the training comprising computing a plurality of model parameters that relate the feature vectors of the training data to the classification values of the training data.

2. The computer implemented method of claim 1, further comprising providing a captured memory image to the ML production model to generate a malware classification for a process associated with the captured memory image.

3. The computer implemented method of claim 1, wherein the training further comprises determining, by the processing device, whether the classification values of the training data match an output of the ML training model.

4. The computer implemented method of claim 3, further comprising, in response to determining that the classification values of the training data do not match the output of the ML training model, adjusting one or more of the plurality of model parameters and repeating the training of the ML training model based on the training data.

5. The computer implemented method of claim 1, wherein at least one of the plurality of memory image data is captured from the executing process that is running on a virtual machine.

6. The computer implemented method of claim 1, wherein the feature vectors comprise one or more of: a presence of a defined byte n-gram within the memory image data, a presence of a defined string value within the memory image data, characteristics of instruction codes within the memory image data, or a calculated entropy of a portion of the memory image data.

7. The computer implemented method of claim 1, wherein training the ML training model comprises validating the training data with respect to the classification values using cross-validation.

8. A system comprising:
   a memory; and
   a processing device, operatively coupled to the memory, to:
   obtain a plurality of memory image data, respective ones of the memory image data comprising captured memory contents from an executing process;
   provide training data comprising feature vectors and classification values to a machine learning (ML) training model, wherein the feature vectors comprise indications of patterns within the memory image data; and
   train the ML training model based on the training data to generate an ML production model, the training comprising computing a plurality of model parameters that relate the feature vectors of the training data to the classification values of the training data.

9. The system of claim 8, wherein the processing device is further to provide a captured memory image to the ML production model to generate a malware classification for a process associated with the captured memory image.

10. The system of claim 8, wherein the training further comprises determining, by the processing device, whether the classification values of the training data match an output of the ML training model.

11. The system of claim 10, wherein the processing device is further to, in response to determining that the classification values of the training data do not match the output of the ML training model, adjust one or more of the plurality of model parameters and repeating the training of the ML training model based on the training data.

12. The system of claim 8, wherein at least one of the plurality of memory image data is captured from the executing process that is running on a virtual machine.

13. The system of claim 8, wherein the feature vectors comprise one or more of: a presence of a defined byte n-gram within the memory image data, a presence of a defined string value within the memory image data, characteristics of instruction codes within the memory image data, or a calculated entropy of a portion of the memory image data.

14. The system of claim 8, wherein training the ML training model comprises validating the training data with respect to the classification values using cross-validation.

15. A non-transitory computer-readable storage medium including instructions that, when executed by a processing device, cause the processing device to:
   obtain a plurality of memory image data, respective ones of the memory image data comprising captured memory contents from an executing process;
   provide training data comprising feature vectors and classification values to a machine learning (ML) training model executing on the processing device, wherein the feature vectors comprise indications of patterns within the memory image data; and
   train, by the processing device, the ML training model based on the training data to generate an ML production model, the training comprising computing a plurality of model parameters that relate the feature vectors of the training data to the classification values of the training data.

16. The non-transitory computer-readable storage medium of claim 15, wherein the processing device is further to provide a captured memory image to the ML production model to generate a malware classification for a process associated with the captured memory image.

17. The non-transitory computer-readable storage medium of claim 15, wherein the training further comprises determining, by the processing device, whether the classification values of the training data match an output of the ML training model.

18. The non-transitory computer-readable storage medium of claim 17, wherein the processing device is further to, in response to determining that the classification values of the training data do not match the output of the ML training model, adjust one or more of the plurality of model parameters and repeating the training of the ML training model based on the training data.

19. The non-transitory computer-readable storage medium of claim 15, wherein at least one of the plurality of memory image data is captured from the executing process that is running on a virtual machine.

20. The non-transitory computer-readable storage medium of claim 15, wherein the feature vectors comprise one or more of: a presence of a defined byte n-gram within the memory image data, a presence of a defined string value within the memory image data, characteristics of instruction codes within the memory image data, or a calculated entropy of a portion of the memory image data.

\* \* \* \* \*